United States Patent [19]

Tomlinson

[11] 4,400,768
[45] Aug. 23, 1983

[54] PARALLEL ACCESS COMPUTER MEMORY SYSTEM EMPLOYING A POWER-OF-TWO MEMORY MODULES

[75] Inventor: Christopher J. Tomlinson, Malvern, Pa.

[73] Assignee: Burroughs Corporation, Detroit, Mich.

[21] Appl. No.: 156,357

[22] Filed: Jun. 4, 1980

[51] Int. Cl.³ ............................................... G06F 15/16
[52] U.S. Cl. ..................................... 364/200; 364/900
[58] Field of Search ... 364/200 MS File, 900 MS File

[56] References Cited

U.S. PATENT DOCUMENTS 4,051,551 10/1977 Lawrie et al. ........................ 364/200

Primary Examiner—Felix D. Gruber
Assistant Examiner—Terence T. Flyntz
Attorney, Agent, or Firm—Leonard C. Brenner; Mervyn L. Young; Kevin R. Petersen

[57] ABSTRACT

In a parallel data processing system architecture capable of processing in parallel a plurality of data elements from a linear vector stored in a memory module array having in number a power-of-two memory modules, a high degree of conflict-free access to the stored linear vector data elements is achieved through skewed storage wherein a skewing occurs at every Mth address and a further skewing at every $M^2$ address wherein M (a power-of-two) is equal to the number of memory modules. The data elements are fetched through a connection network for processing in a processor array having in number a power-of-two processors.

4 Claims, 6 Drawing Figures

Fig. 3

| MEMORY LOCATION (L) | MEMORY NUMBER (M) 0 | 1 | 2 | 3 | |
|---|---|---|---|---|---|
| 0 | 0 | 1 | 2 | 3 | ⎫ |
| 1 | 7 | 4 | 5 | 6 | |
| 2 | 10 | 11 | 8 | 9 | ⎬ BASE ADDRESSES |
| 3 | 13 | 14 | 15 | 12 | |
| 4 | 19 | 16 | 17 | 18 | |
| 5 | 22 | 23 | 20 | 21 | ⎭ |
| 6 | 0,1 | 0,2 | 0,3 | 0,0 | ⎫ |
| 7 | 0,4 | 1,0 | 1,1 | 1,2 | |
| 8 | 2,0 | 2,1 | 3,0 | 2,2 | |
| 9 | • | • | • | • | |
| 10 | • | • | • | • | ⎬ STORED MATRIX |
| 11 | • | • | • | • | |
| 12 | • | • | • | • | |
| 13 | • | • | • | • | |
| 14 | • | • | • | • | ⎭ |

Fig. 4

| M | DEL | M-DEL |
|---|---|---|
| 2 | 1 | 1 |
| 4 | 1 | 3 |
| 8 | 1 | 7 |
| 16 | 3 | 13 |
| 32 | 1 | 31 |
| 64 | -3 | 67 |
| 128 | 1 | 127 |
| 256 | -1 | 257 |
| 512 | 3 | 509 |
| 1024 | 3 | 1021 |
| 2048 | 1 | 2047 |
| 4096 | 3 | 4093 |
| 8192 | 1 | 8191 |
| 16384 | 3 | 16381 |
| 32768 | -3 | 32771 |
| 65536 | -1 | 65537 |

PARALLEL ACCESS COMPUTER MEMORY SYSTEM EMPLOYING A POWER-OF-TWO MEMORY MODULES

BACKGROUND OF THE DISCLOSURE

As speed requirements of computer processing units have increased, systems employing greater numbers of parallel memory modules have been developed. One such system has in the order of 64 parallel memories, see U.S. Pat. No. 3,537,074, issued Oct. 27, 1970 to R. A. Stokes et al, and assigned to the assignee of the present invention.

Parallel memory systems generally suffer however from unavoidable memory conflicts. Severe storage problems frequently arise in performing matrix computations. Consider for example, a typical two-dimensional matrix having its elements stored column-by-column in a parallel memory array. Under such a storage system, row, forward diagonal and reverse diagonal elements may be accessed in parallel. However, column elements must be accessed serially out of each memory. Thus a memory conflict arises which limits the processing capability of the parallel memory systems.

Other storage systems permit parallel access to a matrix column but may cause a conflict for row, diagonal or other matrix vector access. The conflict problem has been studied, see Budnik and Kuck, "The Organization and Use of Parallel Memories", IEEE TRANSACTIONS ON COMPUTERS, December 1971, pages 1566–1569 and "Access and Alignment of Data in an Array Processor". D. H. Lawrie, IEEE TRANSACTIONS ON COMPUTERS, December 1975. However, attempts to solve the conflict problem generally lead to a relatively complex memory storage system and tend to increase the complexity of aligning the plurality of parallel memories with the associated plurality of arithmetic units or processors.

Further, attempts to resolve the conflict problem in the past generally resulted in systems having an odd number (usually prime) of processors and an even number (usually a power of two) of memory modules, see U.S. Pat. No. 4,101,960, issued July 18, 1978, to R. A. Stokes et al and assigned to the assignee of the present invention.

However, a prime number of processors in an array lead to relatively complex hardware problems in providing a connection network to an even number of memory modules. In a parallel array system such as disclosed in U.S. patent application Ser. No. 097,191 filed Nov. 26, 1979 by G. H. Barnes and assigned to the assignee of the present invention, an Omega type connection network is proposed and a processor array is utilized in which each processor functions with a degree of independence and is not locked-step with all all other processors in the array. In such a system a perfect conflict free storage system cannot be fully utilized due to the imperfections of the Omega type connection network (as compared to a crossbar network, for example) and the non-locked-step functioning of the processor array. All that is required is that the minor conflicts introduced by a slightly imperfect storage system do not contribute significantly to the other imperfections already built into the system. Thus a tradeoff of complete conflict protection for hardware simplicity and other benefits is of great value in an array system, particularly one utilizing other than a crossbar connection network and a non-locked-step processor array. This tradeoff is especially beneficial in a system such as disclosed in the above cited U.S. Ser. No. 097,191 patent application wherein each processor in an array thereof must have sufficient hardware and capability to generate its storage mapping procedures.

OBJECTS AND SUMMARY OF THE INVENTION

It is therefore an object of the invention to provide a parallel processor array having relatively conflict free access to linear data vectors stored within a parallel memory module array.

It is another object of the invention to provide a parallel processor array wherein memory module address locations computations are simple and do not involve a modulo prime calculation.

It is yet another object of the invention to provide a parallel processor array wherein all integer division and modulo operations encountered in memory module address location computations are mere power of two operations.

The above and other objects of the present invention are realized in a parallel processor architecture having a power of two number of processors, a power of two number of memory modules, and a connection network therebetween. A high degree of conflict free access to linear vector data elements stored in memory modules is achieved through skewed storage wherein a skewing occurs at every Mth address and a further skewing at every $M^2$ address wherein M (a power of two) is equal to the number of memory modules.

DESCRIPTION OF THE DRAWING

The above-mentioned and other objects, advantages and features of the present invention will become more readily apparent from a review of the following specification taken together with the drawings wherein:

FIG. 3 represents the mapping of the matrix of FIG. 2 into the system of FIG. 1 in accord with the present invention;

FIG. 4 represents in tabular formation the optimum values for "del" used in the mapping function of FIG. 3 for various values of M, the number of memories in the parallel array thereof.

DESCRIPTION OF THE PREFERRRED EMBODIMENT

Figures 1, 2:
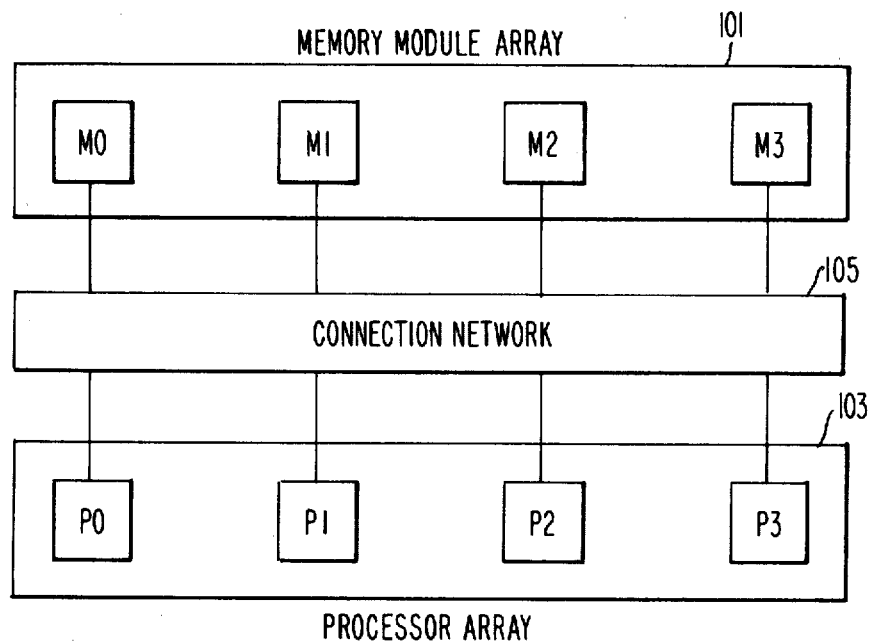
FIG. 1 is a block diagram of a parallel memory data processing system employing the power-of-two number of memory modules and processors for the linear vector access operation of the present invention.
FIG. 2 represents a two-dimensional matrix storable in the parallel memory data processing system of FIG. 1.

With reference to FIG. 1, it can be seen that the working environment of the present invention incorporates a memory module array 101, a processor array 103, and a connection network 105 interposed therebetween. Data is loaded into the memory module array 101 as disclosed in U.S. patent application Ser. No. 097,191 for an "Array Processor Architecture", filed Nov. 26, 1979 in the name of G. H. Barnes et al and assigned to the assignee of the present invention, said application herewith by incorporation being made part of the present application.

The present invention incorporates a power-of-two memory modules, designated M0 though M3 in FIG. 1, in the memory module array 101. The actual preferred number of memory modules in any given memory module array 101 depends on the size of each memory module, the degree of parallelism desired for a given technical application, speed (throughput) requirements, and other factors such as cost and reliability considerations. For example, the parallel processing system disclosed in U.S. Pat. No. 4,051,551 suggests 67 memory modules which as the closest power-of-two would be 64. U.S. Pat. No. 4,101,960 discloses a parallel processing system having 17 memory modules which as the closest power-of-two would be 16. The above-cited U.S. patent application Ser. No. 097,191 filed Nov. 26, 1979 in the name of G. H. Barnes et al suggests 521 memory modules which as the closest power-of-two would be 512. To facilitate an understanding of the present invention without undue complexity, four memory modules, M0 through M4 will be assumed as illustrated in FIG. 1.

The processor array 103 consists of the same number of processors (designated P0 through P3 in FIG. 1) as the number of memory modules in the memory module array 101. The processors are of the type and operate in the fashion disclosed in the above-cited U.S. patents and pending application. Simply, the processors in the processor array 103 request data from the memory module array 101, perform an operation upon that data and return it to the memory module array 101. Normally, all the processors fetch, operate and store in the lock-step parallel synchronization but this is not necessary in the system disclosed in the above-cited patent application Ser. No. 097,191. Each processor in the array 103 thereof may fetch or store a data element in any memory module in the array 101. Hence a connection network 105 is required.

The preferred connection network 105 is for the present invention a network of the Omega type constructed and operating as described in the above-cited U.S. patent application Ser. No. 097,191. Each processor in the array 103 thereof issues a request for a particular memory module in the array 101 thereof. The connection network 105 honors the request and establishes the connection. Once the connection is established, the desired location with the connected memory module is transmitted across the connection network 103 and data is then accessed therefrom or thereto depending on whether data is to be read or written.

Consider a standard formatted two-dimensional matrix of size 5×5, see FIG. 2. Such a matrix is mapped into the memory module array 101 in accord with the two dimensional storage method of the present invention wherein:

$$A(P) = j \cdot K + k + \text{Base} + r \cdot d \cdot p$$

$$L(P) = A(P) \text{DIV} M$$

$$M(P) = (A(P) + del \cdot L(P) + g(L(P) \text{DIV} M)) \text{modulo } M$$

where:

A(P) = A vector address in The Memory Array associated with a given processor (P) in the Processor Array, L(P) = The location with a given memory module of A(P)

M(P) = The memory module of A(P)

DIV = integer divide j,k = starting element of vector r = increment k = length of row M = number of memories in Memory Array Base = number of array mapping start address del = a small odd number chosen to assure that M-del is prime or at least comprises large factors. Optimum values of del have been found to be + or −1 and + or −3.

g = a small skewing number of 0, +1 or −1. The value +1 appears optimum for relatively small values of M.

d = distance between two consecutive elements of a M-vector

For example:
   d = 1 for row
   d = K for column
   d = K + 1 for forward diagonal
   d = K − 1 for reverse diagonal For values of g = del = +1 and a base address of 24 the 5×5 matrix of FIG. 2 is loaded into the four memory, four processor system of FIG. 1 as shown in FIG. 3. As can be seen the values of g and del contribute to skewing and a good conflict free vector selection. The optimum values for del have been on opposite sides of slit 28, which would normally be visible determined to be as shown in FIG. 4. Values of del less than optimum may be chosen but the criteria for good conflict free vector selection requires that M-del be prime or at least be comprised of large factors. Examples of how vectors are fetched and stored in a parallel memory system are detailed in U.S. Pat. No. 4,051,551 issued to Lawrie et al on Sept. 27, 1977 for a system having a prime number of memories in the array thereof.

In the environment of the parallel system and connection network disclosed in U.S. patent applications Ser. No. 097,191 and Ser. No. 097,491, filed Nov. 26, 1979 in the name of G. H. Barnes et al, the operation of the present invention is straight forward. A processor (P) seeks to write or fetch from an address A(P). From the above equations a specific memory module M(P) is calculated and a connection path is secured between the requesting processor (P) and the requested memory module M(P), The location L(P) within the requested memory module is calculated and data is then read or written thereto. For linear vector calculation the following relationship holds:

$$A(P) = A(O) + p \cdot r \cdot d$$

Figure 5:
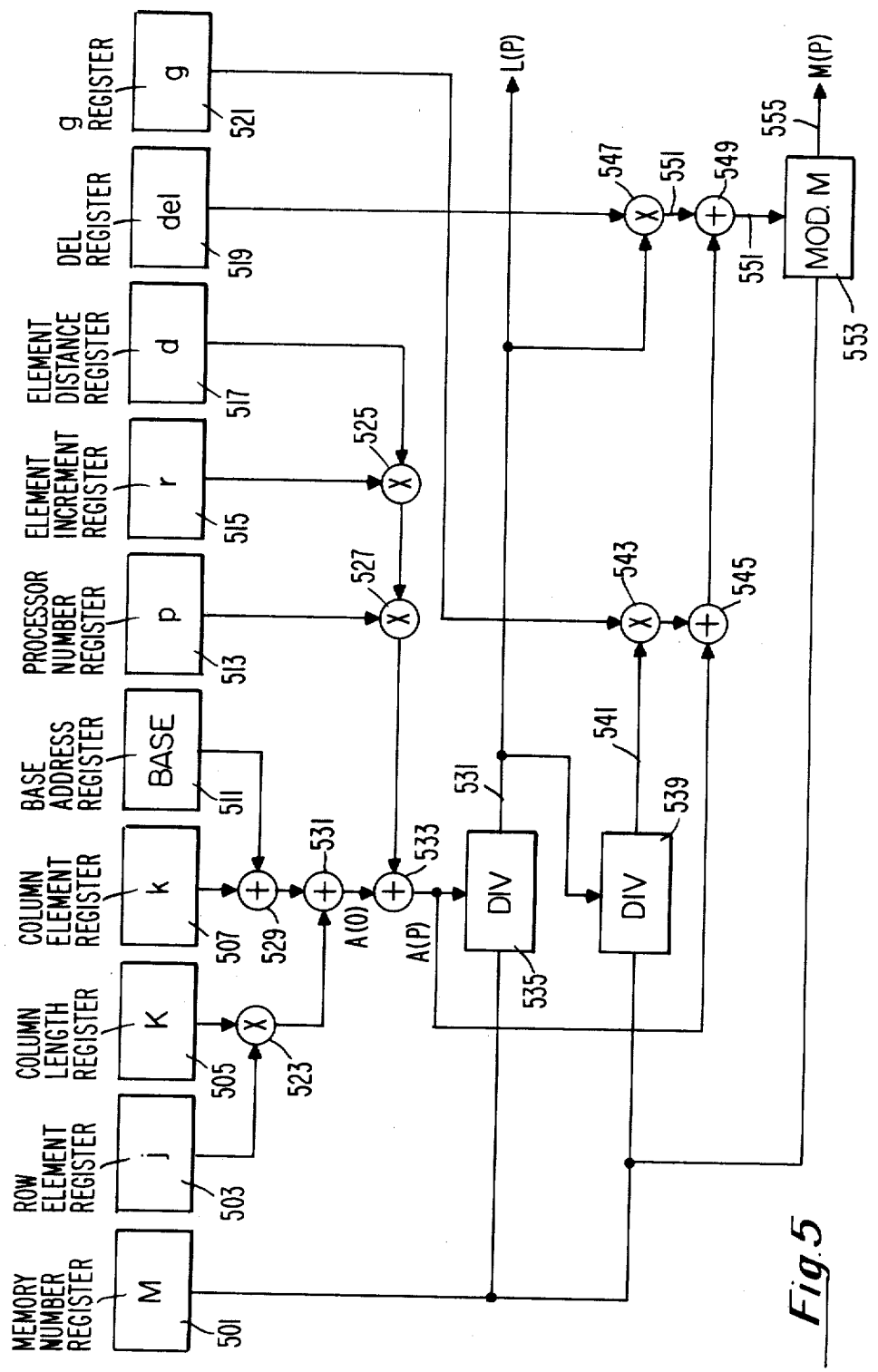
FIG. 5 represents the hardware implementation for generating data storage designating indicia M(P) and L(P) for parallel memory data processing system storing a two-dimensional matrix in accord with the present invention.

The hardware implementation of the above-described stored system for a two-dimensional matrix is relatively simple and is accomplished with standard digital computing hardware, see FIG. 5. A number of storage elements are provided which herein will be referred to as registers but which in other embodiments may be implemented otherwise, such as memories. The M register 501 stores the binary value of the number of memory modules in the memory module array 101. This number is a power-of-two number. The j register 503 and the k register 507 store the starting elements of the M vector desired to be accessed. Thus, both the j register 503 and the k register 507 must be incrementable or otherwise variable. The K register 509 stores the length of the row of a matrix being accessed. This register remains unchanged during the complete accessing of any given matrix. Again, the K register 509 must be changeable to accommodate matrices of varying length and rows. The base register 511 is of size sufficient to represent essentially all of the addresses in any given memory module in the memory module array 101. Thus the size of the base register 511 depends upon the address size of each memory module in the total number of memory modules in the memory module array 101. The base value stored in the base register 511 remains constant throughout the access of any given matrix. The P register 513 stores the binary representation of the number of the particular processor in the processor array 103 used in the calculation of L(P) and M(P). Thus the P register 513 is of size sufficient to store the binary representation of the largest number of processors used in a given application. The k register 515 stores the binary representation of the value of the desired increment of elements along a given M vector. Thus, in a given application, the size of the r register 515 is dependent upon the largest increment desired to be used in a given calculation. Most commonly the increment value r is chosen to be unity. The d register 517 sotres the binary representation of the value d which is equal to the distance between two consecutive elements of M vector. For example, d is equal to 1 for a row, K for a column, K+1 for a forward diagonal and K−1 for a reverse diagonal. The d register 517 must be incrementable or otherwise changeable for the purpose of accessing various M vectors. The del register 517 is used to store values of del which will be plus or minus either one or three. The value of a del depends upon the value of M and may be derived therefrom in accord with FIG. 4. A decoder or ROM or simpler means may be utilized for the derivation of del for any particular size M. The g register 512 is used to contain a small number being either zero or plus or minus one. The value of g is chosen as a function of the value stored in the M register 501 and may be derived through a decoder or ROM as was described for the derivation of del in the del register 519.

The value stored in the j register 503 and the K register 505 are combined in a multiplier 523. Multiplier 523 is a standard binary multiplier or a plurality thereof, such as a plurality of Motorola MC1083 multipliers. The number of standard multipliers to be parallel depend upon the binary length of the values stored in the j register 503 and the K register 505. Likewise, the values stored in the r register 513 and the d register 517 are combined in multipler 525 which is similar in construction to the multiplier 523. Multiplier 527 combines the output of multiplier 525 with the value stored in the P register 513. A conventional binary adder 529 is used to combine the output of the k register 507 and the base register 511. A second binary adder 531 is used to combine the output of the adder 529 and the multiplier 523. The output of the adder 531 is combined with the output of multiplier 527 in an adder 533.

The output of adder 533 is fed into an integer divider to generate the result of the integer division of the output of adder 533 by the value M. Since M is a power two and the output of adder 533 is expressed in binary form, the integer divider 535 is physically represented in alternate embodiments as either a shift register or masking circuit as disclosed in U.S. Pat. No. 4,012,722, issued Mar. 15, 1977 to Gajski et al. The output 537 of the integer divider 535 is L(p) is, as can be seen with reference to FIG. 3, the memory location for a particular processor in the processor array 103.

The output of the integer divider 535 is fed into another integer 539 which is the same in form and function as the integer divider 535. The output 541 of the integer divider 539 is multiplied together with the output of the g register 521 in multiplier 543. The output of the multiplier 543 is added with the output of adder 533 in adder 545. The output of integer divider 535 is multiplied together with the output of the del register 519 in multiplier 537. The output of the multiplier 547 is added with the output of the adder 545 in adder 549.

The output of adder 549 is provided to the input 551 of a binary to modulo M translator 553 whose output 555 is M(p). Since M is the present invention is a power-of-two, the modulo translator 553 is implemented simply as a shift register or as a mask generator such as described in the above-cited U.S. Pat. No. 4,012,722. The requirement for a relatively complex binary to modulo M translator such as disclosed in U.S. Pat. No. 3,980,874 issued to C. R. Vora on Sept. 14, 1976, is thus eliminated. Thus, the calculation of M(p) and L(p) is accomplished with merely a limited plurality of adders, multipliers and either shift registers or mask generators.

The extension of the present invention from a two dimensional to a three dimensional system follows a simple logical progression. Such a three dimensional matrix is mapped into the memory module 101 in accord with the three dimension storage method of the present invention wherein:

$$A(P) = J \cdot K \cdot i + K \cdot J + k + \text{base} + r \cdot d \cdot x$$

$$L(P) = A(P) \text{DIV} M$$

$$M(P) = (A(P) + del \cdot L(P) + g(L(P) DIV M)) \text{modulo } M$$

where:
i,j,k = starting element of M vectors
I,J,K = dimension of array
Base = array, mapping, starting, address
r = increment
d = distance between two consecutive elements of a M vector
M = number of memories in memory array
del = a small odd number chosen to assure that M-del is prime or at least comprises large factors.
g = a small skewing number of zero plus one or minus one. g is usually plus one.

Figure 6:
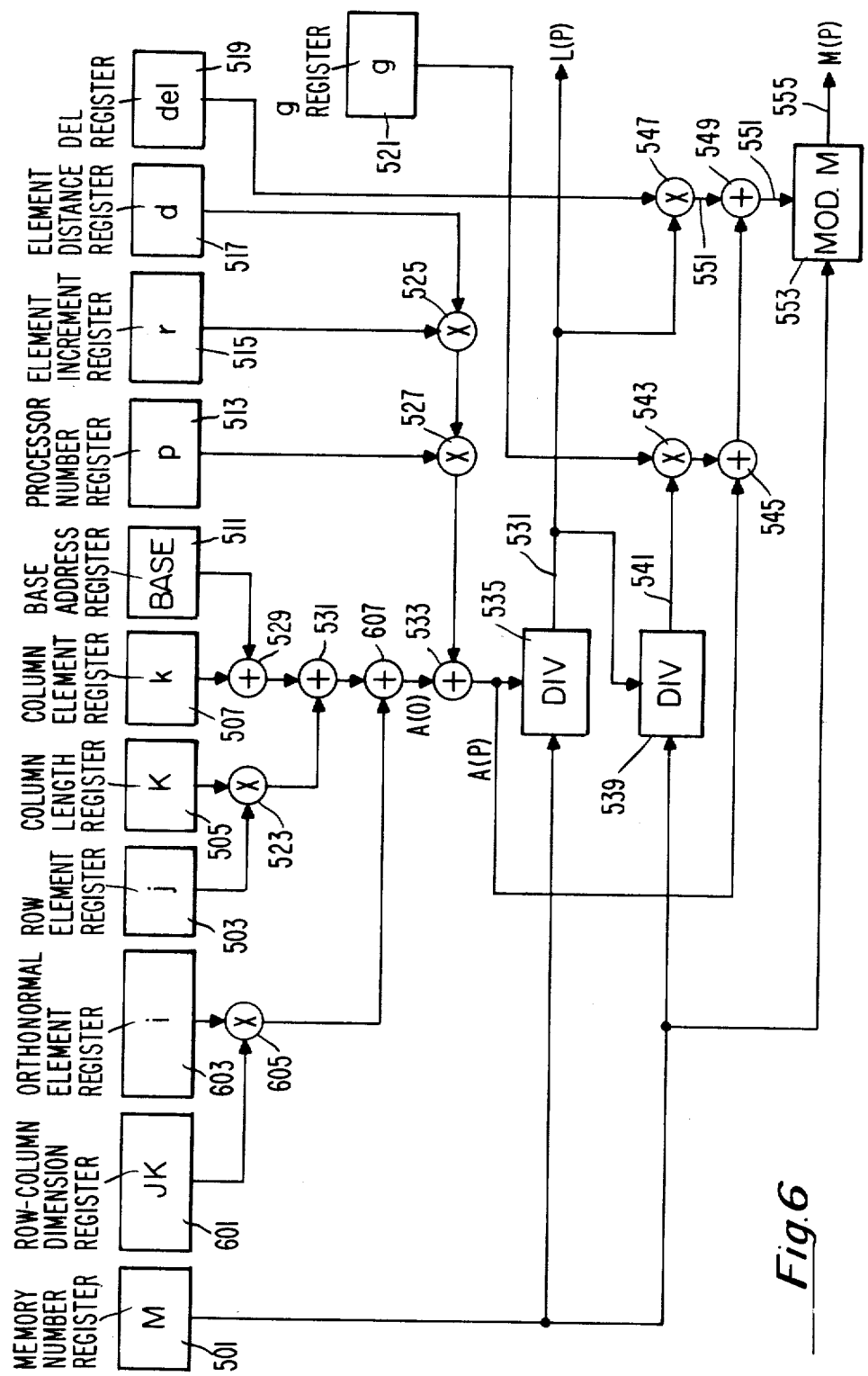
FIG. 6 represents the hardware implemention for generating data storage indicia M(P) and L(P) for a parallel memory data processing system storing a three-dimensional matrix in accord with the present invention.

The hardware implementation for a system realizing the above described three dimensional matrix storing and accessing system is shown in FIG. 6. By comparison with the two dimensional system above-described in FIG. 5, it can be seen that only the four additional elements will be described herein an i register 603 stores in binary form the beginning i location of each starting element in an M vector to be accessed. It is understood that the i register 603 must be incrementable or otherwise changeable to adjust to varying starting locations. A J K register 601 stores the value of J times K.

The outputs of the i register 603 and the JK register 601 are summed in multiplier 605 whih is in operation and function identical to the above-described multiplier 523. The output of the multiplier 605 is combined in adder 607 with the output of adder 53. Adder 607 is identical in structure and function as the above-described adders 539, 521 and 533. The remaining portion of the hardware implementation for a three dimensional matrix storage system based upon the present invention shown in FIG. 6 is identical to that shown in FIG. 5 for a two-dimensional storage system. It can be seen that the systems of FIG. 5 and FIG. 6 generate an address A(O) at the input of adder 533 and produce at the output the associated address A(P) for any processor in the processor array 103. From the address A(P) the identity of the module M(P) and the location within that module L(P) are generated. Since the value M representing the number of memories in the memory module array 101 is always a power-of-two, the implementation of the integer divider 535 and 539 and the modulo M translator 553 may be realized as simple shift registers or masking generators.

It is clear to those skilled in the art that the various changes could be introduced to the above disclosed embodiments. For example, in the instances where the number of modules M and the number of processors P in the arrays 101 and 103 thereof are constant then the M register 501 and/or the P register 513 may be in essence deleted and the value thereof hardwired into the rest of the apparatus. Thus, while the invention has been particularly shown and described with reference to a preferred embodiment thereof, it will be understood by those skilled in the art that various changes in form and detail may be made therein.

What is claimed is:

1. A parallel data processing system architecture capable of processing in parallel a plurality data elements from a stored linear vector, said parallel data processing system architecture comprising:

a plurality of parallel processors, each processor therein for fetching and processing a particularly associated data element of said stored linear vector, said plurality of parallel processors being in number a power-of-two;

a plurality of parallel addressable memory modules storing said linear vector, said data element thereof particularly associated with each processor (P) stored at an address A(P), each memory module in said plurality thereof having a plurality of data element storage locations, each data element storage location therein for storing an individual data element of said linear vector, said plurality of parallel addressable memory modules being in number a power-of-two other than two;

connection network means interposing said plurality of parallel addressable memory modules and said plurality of parallel processors, said connection network means for providing a plurality of requested data communications paths between said plurality of parallel processors wherein each provided data communications path in said plurality thereof is provided as requested to an individual memory module in said plurality of parallel processors for the fetching of a data element of said stored linear vector from said individual memory module to said individual processor; and means associated with each parallel processor in said plurality thereof for requesting a data communications path through said connection network means to a particular addressable memory module M(p) in said plurality thereof and for specifying a particular storage location L(P) in said plurality thereof in accord with the relationships:

$$M(P) = (A(P) + del \cdot L(P) + g \cdot (L(P) DIVM)) \text{modulo } M,$$
and $$L(P) = A(P) DIVM$$

wherein:

A(P) = the address storing said particularly associated data element associated with a particular processor (P) in said plurality thereof, M(P) = the particular memory module in said plurality thereof storing said particularly associated data element, L(P) = the particular storage location within M(P) storing said particularly associated data element, DIV = integer division, M = the number of memory modules in said plurality thereof, del = a small odd integer chosen to assure that M-del is a prime number, and g = the number positive unity.

2. The parallel processing system architecture according to claim 1 wherein said plurality of parallel processors is equal in number to said plurality of parallel addressable memory modules.

3. A parallel data processing system architecture capable of processing in parallel a plurality data elements from a stored linear vector, said parallel data processing system architecture comprising:

a plurality of parallel processors, each processor therein for fetching and processing a particularly associated data element of said stored linear vector, said plurality of parallel processors being in number a power-of-two;

a plurality of parallel addressable memory modules storing said linear vector, said data element thereof particularly associated with each processor (P) stored at an address A(P), each memory module in said plurality thereof having a plurality of data element storage locations, each data element sotrage location therein for storing an individual data element of said linear vector, said plurality of parallel addressable memory modules being in number a power-of-two other than two;

connection network means interposing said plurality of parallel addressable memory modules and said plurality of parallel processors, said connection network means for providing a plurality of requested data communications paths between said plurality of parallel addressable memory modules and said plurality of parallel processors wherein each provided data communications path in said plurality thereof is provided as requested to an individual memory module in said plurality of parallel addressable memory modules from an individual processor in said plurality of parallel processors for the fetching a data element of said stored linear vector from said individual memory module to said individual processor; and means associated with each parallel processor in said plurality thereof for requesting a data communications path through said connection network means to a particular addressable memory module M(P) in said plurality thereof and for specifying a particular storage location L(P) in said plurality thereof in accord with the relationships:

$$M(P) = (A(P) + del \cdot L(P) + g \cdot (L(P) DIV M)) \text{modulo } M,$$
and
$$L(P) = A(P) DIV M$$

wherein:
- A(P) = the address storing said particularly associated data element associated with a particular processor (P) in said plurality thereof,
- M(P) = the particular memory module in said plurality thereof storing said particularly associated data element,
- L(P) = the particular storage location within M(P) storing said particularly associated data element,
- DIV = integer division,
- M = the number of memory modules in said plurality thereof,
- del = a small odd integer chosen to assure that M-del has no small factors other than unity, and
- g = a small skewing number.

4. The parallel processing system architecture according to claim 3 wherein said plurality of parallel processors equal in number said plurality of parallel addressable memory modules.

* * * * *